US009001751B2

(12) United States Patent
Yuk et al.

(10) Patent No.: US 9,001,751 B2
(45) Date of Patent: Apr. 7, 2015

(54) METHOD AND APPARATUS FOR TRANSMITTING AND RECEIVING CONTROL CHANNEL IN A MULTI-CARRIER COMMUNICATIONS SYSTEM

(75) Inventors: Young-Soo Yuk, Gyeonggi-Do (KR); In-Uk Jung, Gyeonggi-Do (KR); Yong-Ho Kim, Gyeonggi-Do (KR); Ki-Seon Ryu, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 306 days.

(21) Appl. No.: 13/120,900

(22) PCT Filed: Sep. 25, 2009

(86) PCT No.: PCT/KR2009/005501
§ 371 (c)(1),
(2), (4) Date: Mar. 24, 2011

(87) PCT Pub. No.: WO2010/036063
PCT Pub. Date: Jan. 4, 2010

(65) Prior Publication Data
US 2011/0176507 A1   Jul. 21, 2011

Related U.S. Application Data

(60) Provisional application No. 61/100,272, filed on Sep. 26, 2008, provisional application No. 61/157,538, filed on Mar. 4, 2009.

(51) Int. Cl.
*H04L 5/00* (2006.01)
(52) U.S. Cl.
CPC .............. *H04L 5/0007* (2013.01); *H04L 5/003* (2013.01); *H04L 5/0053* (2013.01)
(58) Field of Classification Search
USPC .................................................. 370/328–338
See application file for complete search history.

(56) References Cited

U.S. PATENT DOCUMENTS 5,915,210 A * 6/1999 Cameron et al. ............. 455/59
2005/0111535 A1   5/2005 Sacy
(Continued)

FOREIGN PATENT DOCUMENTS

KR   10-2006-0109799 A   10/2006
KR   10-2007-0015897 A   2/2007

OTHER PUBLICATIONS

Qualcomm, Multicarrier Control for LTE-Advanced, R1-091460, 2009.*
Motorola, Comparison of PDCCH Structures for Carrier Aggregation, R1-091326, 2009.*
International Search Report for copending Application PCT/KR2009/005501, dated May 14, 2010.
(Continued)

*Primary Examiner* — Marcus R Smith
(74) *Attorney, Agent, or Firm* — Birch, Stewart, Kolasch & Birch, LLP (57) ABSTRACT

The present invention relates to a method and apparatus for transmitting and receiving data in a multi-carrier communications system. The data transmission/receiving method uses multiple carriers including a primary carrier that is capable of transmitting and receiving data traffic and PHY/MAC control information between a terminal and a base station and at least one secondary carrier that transmits and receives down-link data traffic between the terminal and the base station. The method comprises: generating an MPDU (MAC Protocol Data Unit) to be sent to a PHY (Physical) layer in an MAC (Medium Access Control) layer; performing channel-coding and modulation on the MPDU to generate a modulated symbol sequence in the PHY layer; segmenting the modulated symbol sequence into multiple symbol sequences; and allocating the multiple segmented symbol sequences to multiple carriers, respectively, to perform IFFT (Inverse Fast Fourier Transform) and transmit to a terminal, wherein control information on the multiple carriers is allocated to a control channel region of the primary carrier and transmitted via the primary carrier.

12 Claims, 6 Drawing Sheets

(56) References Cited

U.S. PATENT DOCUMENTS

| | | |
|---|---|---|
| 2006/0223574 A1 | 10/2006 | Chandra |
| 2007/0165731 A1* | 7/2007 | Xiao et al. ............ 375/260 |
| 2008/0242340 A1 | 10/2008 | Kang et al. |
| 2008/0259842 A1* | 10/2008 | Cai ............ 370/328 |
| 2009/0022178 A1* | 1/2009 | Ji et al. ............ 370/470 |
| 2009/0219910 A1* | 9/2009 | Han et al. ............ 370/343 |
| 2009/0262699 A1* | 10/2009 | Wengerter et al. ............ 370/330 |
| 2009/0274085 A1* | 11/2009 | Wang et al. ............ 370/312 |
| 2010/0113043 A1* | 5/2010 | Hsuan et al. ............ 455/450 |
| 2010/0220674 A1 | 9/2010 | Fu |
| 2010/0272051 A1 | 10/2010 | Fu et al. |
| 2011/0274066 A1* | 11/2011 | Tee et al. ............ 370/329 |

OTHER PUBLICATIONS

International Search Report for copending Application PCT/KR2010/001354, dated Oct. 13, 2010.

Lee et al., "A New Size-Based Burse Assembly Scheme for OBS Switches", Lecture Notes in Computer Science, 3891, 2006, pp. 1141-1148.

Prasetyo et al., "On the Guard Band-Based Coarse Frequency Offset Estimation Technique for Burst OFDM Systems", IEEE VTC, 2000, pp. 220-224.

Fu, "Harmonized Text Proposal for Multi-Carrier DG Reply Comments—Network Entry", IEEE 802.16 Broadband Wireless Access Working Group, Jul. 14, 2009, 5 pages.

* cited by examiner

(a) PDCCH (b) A-MAP

METHOD AND APPARATUS FOR TRANSMITTING AND RECEIVING CONTROL CHANNEL IN A MULTI-CARRIER COMMUNICATIONS SYSTEM

This application is a National Phase of PCT/KR2009/005501 filed Sep. 25, 2009, which claims priority under 35 USC 119(e) to U.S. Provisional Application Nos. 61/100,272 filed on Sep. 26, 2008 and 61/157,538 filed on Mar. 4, 2009. The entire contents of the above applications are hereby incorporated by reference into the present application.

BACKGROUND OF THE INVENTION

1. Field of the Invention

The present disclosure relates to a method and apparatus for transmitting and receiving control channel in a multi-carrier communication system, and more particularly, to a method and apparatus for transmitting duplicated control information in a plurality of carriers to the control channel of one carrier, thereby allowing more effective control channel transmission and reception.

2. Description of the Related Art

With the development of communication technologies, services provided by a mobile communication system are being gradually developed in various fields such as packet data transmission and reception services sending high-capacity data, multimedia broadcast services as well as voice communication services.

In the third generation services such as WCDMA currently being serviced, high capacity video and data as well as voice can be transmitted and received at a high transmission rate, and moreover, the standardization work is being actively carried out, such as long-term evolution network (LTE), IEEE 802.16m, and the like, to make an evolved network having a wider bandwidth, considering a rapid increase of data traffic in the future.

In particular, IEEE 802.16m for which its standardization work is being actively carried out has set a goal to develop a standard specification satisfying the requirement of an IMT-Advanced system while maintaining compatibility with existing 802.16 standard-based terminals and base station equipment. In the IMT-Advanced system, above all, it is required to support more than 40 MHz of broadband communication service, and in IEEE 802.16m, broadband communication support is also essential to satisfy the requirement of the IMT-Advanced system. However, it is in fact difficult to define a standard for all bandwidths, and as a result, a communication system using a multi-carrier approach that supports broadband using a plurality of carriers is under discussion. In the multi-carrier system discussed under IEEE 802.16m, it is possible to transmit and receive data between the terminal and the base station by simultaneously accessing over at least two and more frequency assignments (FAs), and therefore, it has an advantage of achieving high-capacity, high-speed data transmission and reception compared to the existing single-carrier scheme. Furthermore, it has a feature in which communication is possible while using a broader bandwidth depending on circumstances from the standpoint of a mobile station (MS), and more users can be accommodated from the standpoint of a base station (BS).

In case of transmitting data using a multi-carrier as described above, resource allocation information associated with data transmission should be delivered for each carrier. However, in case of transmitting data using a plurality of carriers, transmitting control information independently for every carrier leads to the consumption of resources, thereby causing serious overhead when performing decoding in a mobile station.

SUMMARY OF THE INVENTION

As described above, an aspect of the present disclosure is to provide a method and apparatus for transmitting and receiving control channel in which when a plurality of carriers are allocated to enhance a downlink data transmission amount in a mobile station, control channel transmission regions for the same user are configured in a sequential manner and control information in each carrier is transmitted over one carrier, thereby preventing the consumption of resources for control information and reducing the decoding overhead of the mobile station.

In order to accomplish the forgoing objective, according to an embodiment of the present disclosure, there is provided a method for transmitting and receiving data using a multi-carrier comprising a primary carrier capable of transmitting and receiving data traffic and PHY/MAC control information between a mobile station and a base station and at least one or more secondary carriers transmitting and receiving downlink data traffic between the mobile station and the base station, and the method may include configuring an MAC protocol data unit (MPDU) in a medium access control (MAC) layer to deliver to a physical (PHY) layer; performing channel coding and modulation for the MPDU in the PHY layer to generate a modulated symbol sequence; segmenting the modulated symbol sequence into a plural number; and allocating the symbol sequences segmented into the plural number to a plurality of carriers, respectively, to perform an inverse fast Fourier transform (IFFT) and transmit to the mobile station, wherein the control information of the plurality of carriers is allocated to a control channel region of the primary carrier and transmitted through the primary carrier.

In order to accomplish the forgoing objective, according to an embodiment of the present disclosure, there is provided a method for receiving data using a multi-carrier comprising a primary carrier capable of transmitting and receiving data traffic and PHY/MAC control information between a mobile station and a base station and at least one or more secondary carriers transmitting and receiving downlink data traffic between the mobile station and the base station, and the method may include performing blind decoding for the control channel of a data frame transmitted to the primary carrier to check a mobile station ID; checking the mobile station ID to detect sequential control channels of the primary carrier and secondary carrier transmitted through the primary carrier, and check the control information of the primary carrier and secondary carrier; and terminating a blind decoding process for the control channel of a data frame transmitted to the primary carrier when any other mobile station ID is detected subsequent to checking the control information of the primary carrier and secondary carrier.

In order to accomplish the forgoing objective, according to an embodiment of the present disclosure, there is provided an apparatus for transmitting and receiving data using a multi-carrier comprising a primary carrier capable of transmitting and receiving data traffic and PHY/MAC control information between a mobile station and a base station and at least one or more secondary carriers transmitting and receiving downlink data traffic between the mobile station and the base station, and the apparatus may include a medium access control (MAC) layer configured to generate an MAC protocol data unit (MPDU); a physical (PHY) layer configured to receive MPDU generated from the MAC layer through a service access point (SAP), perform channel coding and modulation to generate a modulated symbol sequence, and segment the modulated symbol sequence into a plural number; and a RF transceiver configured to allocate the symbol sequences segmented into the plural number to a plurality of carriers, respectively, to perform an inverse fast Fourier transform (IFFT), wherein the control information of the plurality of carriers is sequentially allocated to a plurality of control channel regions having a same channel size and MCS level and transmitted through the primary carrier.

According to the present disclosure, when a plurality of carriers are allocated to enhance a downlink data transmission amount in a mobile station, control channel transmission regions for the same user are configured in a sequential manner and common control information in each carrier is transmitted over one carrier, thereby having an effect of preventing the consumption of resources for control information and reducing the decoding overhead of the mobile station.

DETAILED DESCRIPTION OF THE INVENTION

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Hereinafter, the term "terminal" is used, but the terminal may be also referred to as a subscriber station (SS), user equipment (UE), mobile equipment (ME), and a mobile station (MS). Furthermore, the terminal may be portable equipment having a communication function such as portable phone, PDA, smart phone, notebook, etc., or non-potable equipment such as PC, vehicle mounted device, etc.

Figure 1:
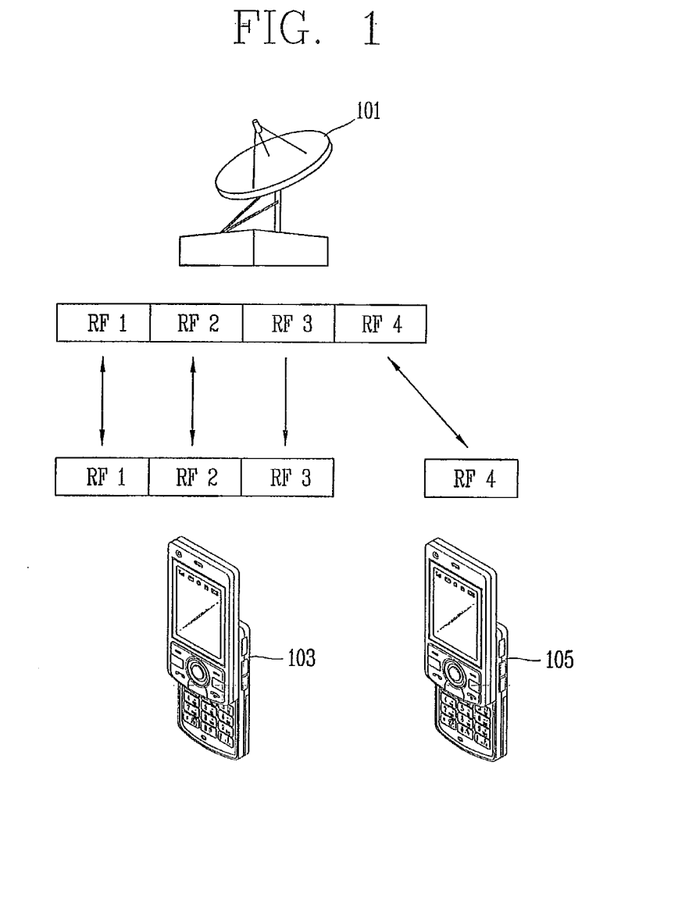
FIG. 1 is a view illustrating a multi-carrier system according to an embodiment of the present disclosure.

FIG. 1 is a view schematically illustrating a multi-carrier system according to an embodiment of the present disclosure.

As illustrated in FIG. 1, in a multi-carrier mode according to the present invention, the number of carriers allocated to a mobile station 103, 105 by a base station 101 to be used for data transmission and reception, or the like, may be at least two or more. According to an embodiment, for the sake of convenience of explanation, it will be described below a case where four carriers RF1, RF2, RF3 and RF4 are used. The base station 101 may allocate multiple carriers RF1, RF2, and RF3 for a mobile station 103 to be used in a multi-carrier mode, and a carrier RF4 may be also allocated to another mobile station 105 by the base station 101. In this case, the first mobile station 103 uses one or more carriers to be operated in a multi-mode, and the second mobile station 105 uses only one carrier to be operated in a single-mode.

In the base station 101, multi-carrier types can be divided into two kinds of groups, a fully configured carrier (hereinafter, "FCC"), and a partially configured carrier (hereinafter, "PCC"). The fully configured carrier is defined as a carrier capable of transmitting and receiving uplink/downlink data and PHY/MAC control information, and the partially configured carrier as a carrier capable of transmitting only downlink data to a mobile station.

Referring to FIG. 1, RF1 and RF2, among the carriers allocated to the first mobile station 103, correspond to the fully configured carrier capable of transmitting and receiving uplink/downlink data and capable of transmitting and receiving PHY/MAC control information of the mobile station. RF3, allocated to the first mobile station 103, corresponds to the partially configured carrier capable of transmitting downlink data only from a base station to a mobile station. The carrier RF4, allocated to the second mobile station 105, corresponds to the fully configured carrier capable of transmitting and receiving uplink/downlink data and capable of transmitting and receiving PHY/MAC control information of the mobile station, and in case of a single-mode type such as the second mobile station 105, the carrier RF4 is preferably allocated in a fully configured carrier type since only one carrier RF4 is allocated.

From the standpoint of the mobile stations 103, 105, the types of carrier allocated from a base station can be divided into two kinds of groups, a primary carrier and a secondary carrier. Preferably, one primary carrier and a plurality of secondary carriers can be allocated to a mobile station from a base station. According to the present invention, the primary carrier can transmit and receive data traffic and PHY/MAC control information between the mobile station and the base station, and functions as a carrier mainly used for a control function of the mobile station such as network entry of the mobile station. Furthermore, the secondary carrier can be allocated to a mobile station based upon a resource allocation command of the base station, and is used as a carrier for mainly transmitting and receiving data traffic.

Referring to FIG. 1, among the carriers allocated to the mobile station 103, RF1 or RF2 may become a primary carrier, and RF3 becomes a secondary carrier. Similarly, RF4 allocated to the mobile station 105 functions as a primary carrier. As illustrated in FIG. 1, in a multi-carrier system, it is possible at the same time to support the mobile station 103 supporting a multi-carrier approach and the mobile station 105 supporting a single-carrier approach only, and the mobile station 103 supporting a multi-carrier approach can be also used as a single-mode using a single-carrier approach based upon data traffic. However, even if it is used as a multi-mode or single-mode, at least one carrier should be allocated, and at this time, the relevant carrier functions as a primary carrier when only one carrier is allocated.

The primary carrier of a mobile station is a fully configured carrier defined by a base station, and the carrier that has performed an initial network entry procedure will be determined as a primary carrier. The secondary carrier can be set to a fully configured carrier or partially configured carrier, and allocated additionally based upon a request or instruction of the mobile station or base station. Preferably, the mobile station can transmit and receive all control information and secondary carrier information through a primary carrier, and mainly receive downlink data through a secondary carrier.

Figure 2:
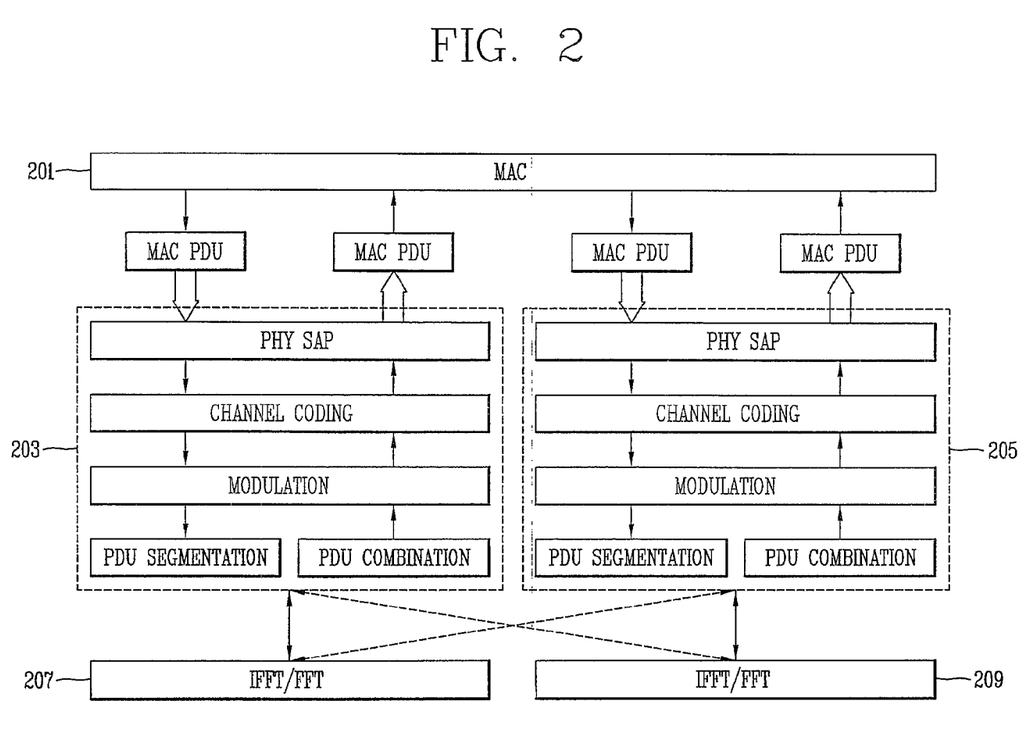
FIG. 2 is a view schematically illustrating the structure of PHY/MAC layers in a multi-carrier system according to an embodiment of the present disclosure.

FIG. 2 is a view schematically illustrating the structure of PHY/MAC layers in a multi-carrier system according to an embodiment of the present disclosure.

As illustrated in the drawing, in a multi-carrier system, one common medium access control (MAC) 201 is linked through a plurality of carriers 207, 209, and physical (PHY) layers 203, 205.

A protocol data unit (PDU), which is a basic data unit generated by the MAC stage, is delivered to PHY 203, 205 through a physical layer service access point (PHY SAP), and PHY 203, 205 performs a channel coding and modulation process, and therefore, a symbol sequence of the modulated PHY PDU is transmitted to the receiving end through radio frequency (RF) carriers 207, 209.

At this time, MAC PDU may be transmitted through one carrier, but MAC PDU may be segmented and transmitted through a plurality of carriers to enhance the efficiency of transmission. In FIG. 2, the portion indicated by dotted lines shows a structure in which data generated by one MAC PDU is passed through a channel coding and modulation process in the physical channel and then divided into two carriers to be transmitted in a segmented manner. The PDU segmentation and combination in the PHY stage illustrated in the drawing is a portion performing the process for segmenting and combining such an MAC PDU.

As illustrated in FIG. 2, when one MAC PDU is segmented into two carriers to be transmitted, it is required to transmit control information for resource allocation to each transmission region. In this case, when control information is transmitted over each carrier, the mobile station receiving control information should perform a blind decoding process with respect to the control channel of every carriers, thereby causing a problem of increasing decoding overhead. Accordingly, according to the present disclosure, control information for a plurality of carriers is transmitted through one carrier, thereby proposing a method for effectively transmitting control information.

Figure 3:
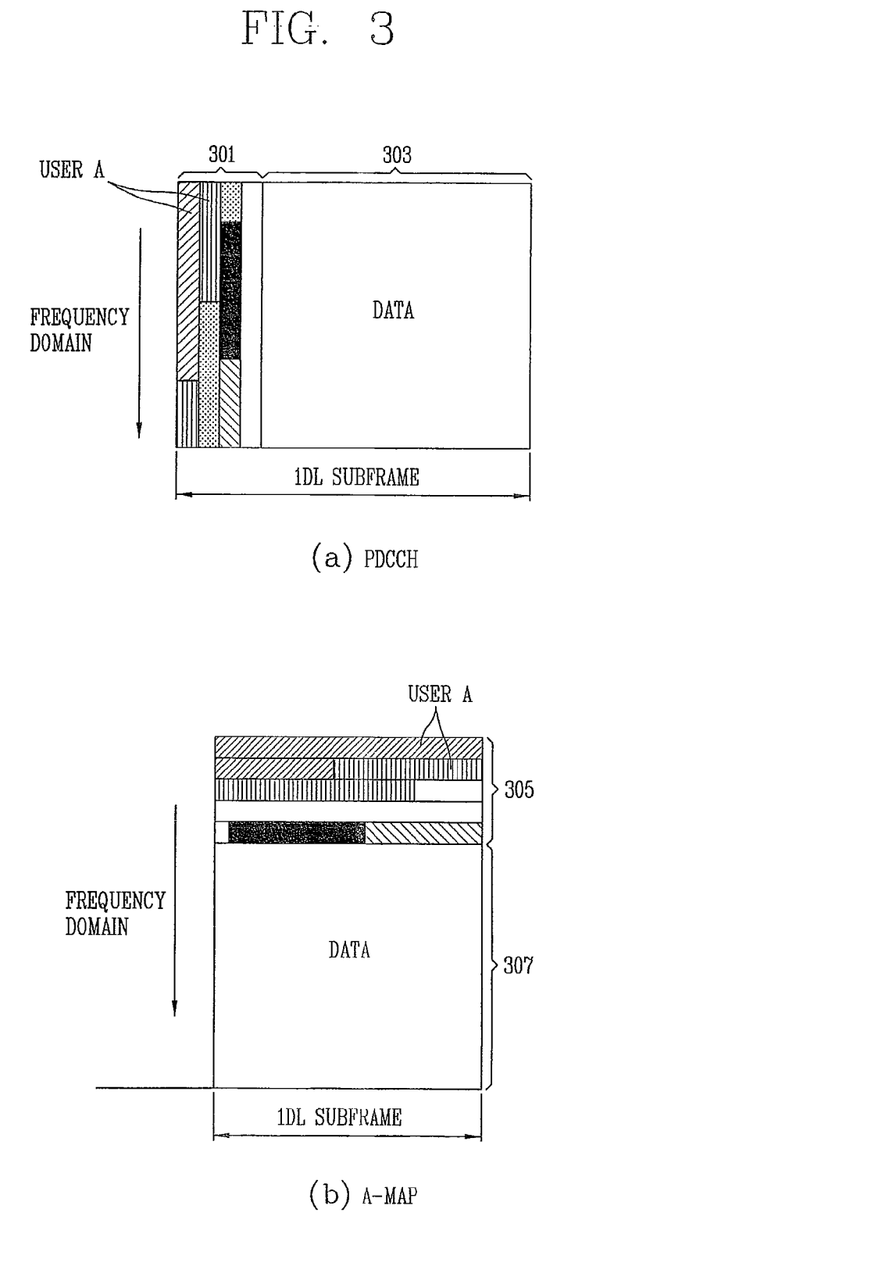
FIG. 3 is a view schematically illustrating a typical control channel structure for resource allocation.

FIG. 3 is a view schematically illustrating a typical control channel structure for resource allocation.

Downlink control channels may exist under various names according to a system structure defined by the standard, and according to the present invention, 3GPP Long Term Evolution (LTE) and IEEE 802.16 systems will be described as a representative example.

One subframe may include a control channel region 301, 305 and a data region 303, 307. The downlink control channel 301 as shown in FIG. 3A illustrates the structure of a physical downlink control channel (PDCCH) defined by a 3GPP LTE system, and the downlink control channel 305 as shown in FIG. 3B illustrates the structure of an Advanced-MAP (A-MAP) defined by an IEEE 802.16 system.

In PDCCH and A-MAP, encoding of control information may be provided in a different manner for each predetermined region. Referring to FIG. 3, different patterns of control channel regions represent different encodings. Accordingly, channels including resource allocation information allocated to the user may be encoded in a different manner, respectively, and a size and a modulation and coding scheme (MCS) level of the channel may be not the same.

The receiving end receives the control channel to search for control information allocated to itself through several times or tens of several times of blind search iterations.

In general, there exist several kinds of limited sized control channels in PDCCH and A-MAP, which support several kinds of MCS levels, respectively. In this case, the receiving end performs repetitive blind decoding iterations for candidate groups having a combination of possible MCS levels and sizes in a control channel, and as a result, the control information will be acquired when the CRC value becomes a desired value. Typically, one mobile station has an ID for identifying itself in a network, and the mobile station's ID will be expressed as a value of RNTI in 3GPP LTE, and expressed as a value of Station ID (SID) in IEEE 802.16m. The value is a dedicated ID for each mobile station, and masked with cyclic redundancy check (CRC) in PDCCH or A-MAP, and if its detected value subsequent to decoding of the CRC is identical to a value of RNTI or STID, then the mobile station may know that it is a channel allocated to itself.

Referring to FIG. 3, two allocated regions exist in a dispersed (not sequential) manner in the control channel allocated to the user A, and the encoding, size and MCS level of every control channel are configured in a different manner.

At the receiving end, the received control channel is decoded through a blind decoding technique, and the number of blind decoding iterations at the receiving end is determined by a size of the transmitted channel and an MCS level applied thereto. For example, if there exist two kinds of control channel sizes of 40 and 60 bits, and two MCS levels of ½ and ⅛ QPSK, then total four times of blind decoding should be carried out for each situation at the receiving end. Accordingly, as diversifying the sizes of the channel or increasing the number of supported MCS levels, an overhead burden for decoding of control information will be created at the receiving end that performs blind decoding.

Typically, a plurality of control channels transmitted to one mobile station have a same MCS level, and thus the number of blind decoding iterations in the mobile station will be reduced if the allocated control channels have a same size. Furthermore, if various control channels transmitted to one mobile station are sequentially transmitted, then the same number of blind decoding iterations as the prior art will be carried out until finding a control channel transmitted for the first time, however, since then, the number of blind decoding iterations will be reduced.

Figure 4:
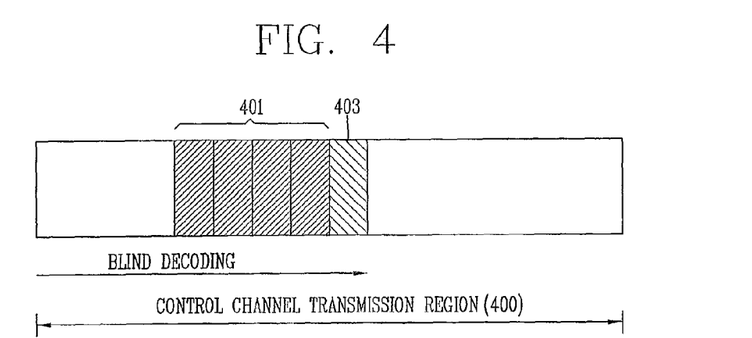
FIG. 4 is a view schematically illustrating control channel allocation according to an embodiment of the present disclosure.

FIG. 4 is a view schematically illustrating control channel allocation according to an embodiment of the present disclosure, in which it is configured that control channels allocated to the same mobile station have a same size and the allocated control channels are sequentially transmitted, thereby providing a method of reducing the number of blind decoding iterations in the mobile station.

A control channel transmission region 400 illustrated in FIG. 4 corresponds to the PDCCH region 301 and A-MAP region 305 illustrated with reference to FIG. 3 as described in the above. The mobile station performs blind decoding for a control channel to search control information delivered to the mobile station itself. At this time, as illustrated in the drawing, if control channels 401 for the user A are configured to have a same size and the region is allocated to be sequentially transmitted, then only one blind decoding may be carried out without performing several times of blind decoding for every control channel region to check its own ID when performing blind decoding in the mobile station. Thereafter, if control channel regions for itself have been terminated but there still exist a control channel 403 for another user B, then the mobile station may know that control channels for itself do not exist anymore, thereby terminating blind decoding to reduce the overall number of blind decoding iterations.

Figure 5:
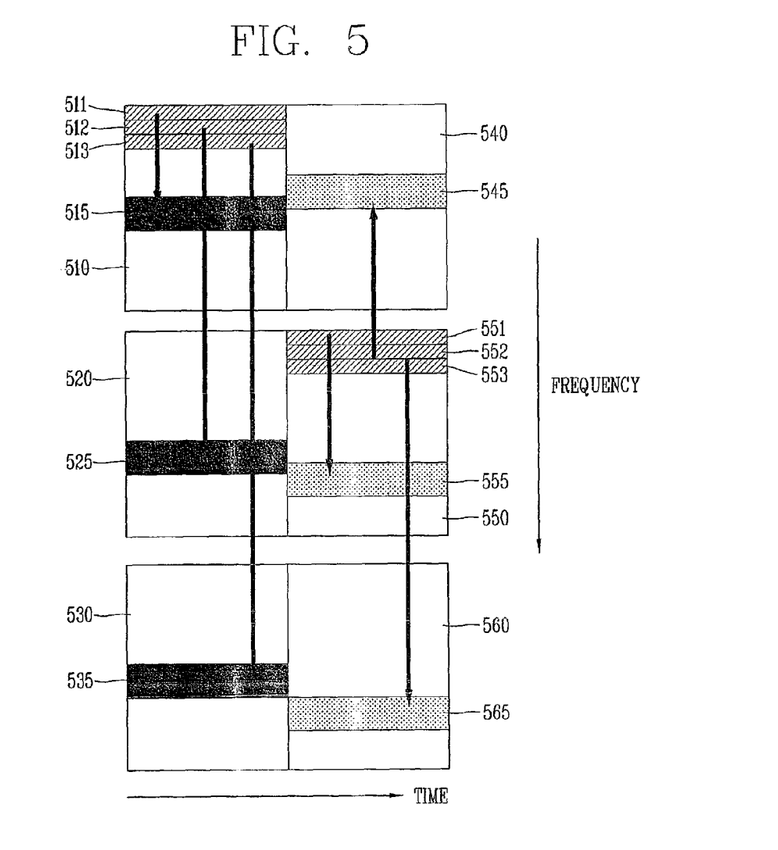
FIG. 5 is a view schematically illustrating a control channel allocation method in a multi-carrier system according to an embodiment of the present disclosure.

FIG. 5 is a view schematically illustrating a control channel allocation method in a multi-carrier system according to an embodiment of the present disclosure.

As illustrated in the above, if control channels are transmitted to every carrier in a multi-carrier system, then an interval for performing blind decoding will be extended. However, if control channels are integrated into one carrier to be transmitted, then the number of blind decoding iterations can be reduced, thereby allowing more effective data transmission.

FIG. 5 is a view illustrating an embodiment in which control channels are transmitted to one carrier in a multi-carrier system performing data transmission and reception through three carriers.

As illustrated in the above, if one MPDU is segmented into three in PHY to be transmitted through three carriers, the first frame (or subframe) is segmented into three and transmitted through three carriers 510, 520, 530, and the second frame (or subframe) is also segmented into three and transmitted through three carriers 540, 550, 560.

In the mobile station 1, it is assumed that the first carrier 510 of the first frame is a primary carrier, and the second and the third carrier 520, 530 thereof are secondary carriers.

In the mobile station 2, it is assumed that the second carrier 550 of the second frame is a primary carrier, and the first and the third carrier 540, 560 thereof are secondary carriers.

At this time, several control channels (A-MAP or PDCCH) for one mobile station are transmitted through primary carriers 510, 550.

As illustrated in the drawing, control channels 511, 512, 513 for the mobile station 1 are transmitted only through the first carrier. In other words, control information for the first carrier 510 is transmitted through the first control channel 511 of the first carrier 510, and control information for the second carrier 520 is transmitted through the second control channel 512 of the first carrier 510, and control information for the third carrier 530 is transmitted through the third control channel 513 of the first carrier 510. In other words, control information for all carriers allocated to the mobile station 1 is transmitted only through the control channel of the first carrier 510, which is a primary carrier, and thus all the resource allocation information of the second and the third carrier 520, 530, which are secondary carriers, is also transmitted through the control channel of the first carrier.

Furthermore, control channels 551, 552, 553 for the mobile station 2 in the second frame are transmitted only through the second carrier. In other words, control information for the second carrier 550 is transmitted through the first control channel 551 of the second carrier 550, and control information for the first carrier 540 is transmitted through the second control channel 522 of the second carrier 550, and control information for the third carrier 560 is transmitted through the third control channel 553 of the second carrier 550. In other words, control information for all carriers of the mobile station 2 is transmitted only through the control channel of the second carrier 550, which is a primary carrier, and thus all the resource allocation information of the first and the third carrier 540, 560, which are secondary carriers, is also transmitted through the control channel of the second carrier 550.

At this time, all the control channels 511, 512, 513 and 551, 552, 553 of one mobile station are configured to have a same channel size and a same MCS level as illustrated in the drawing, and also configured to be sequentially transmitted, thereby minimizing the number of decoding iterations when performing blind decoding for the control channels in the mobile station.

Figure 6:
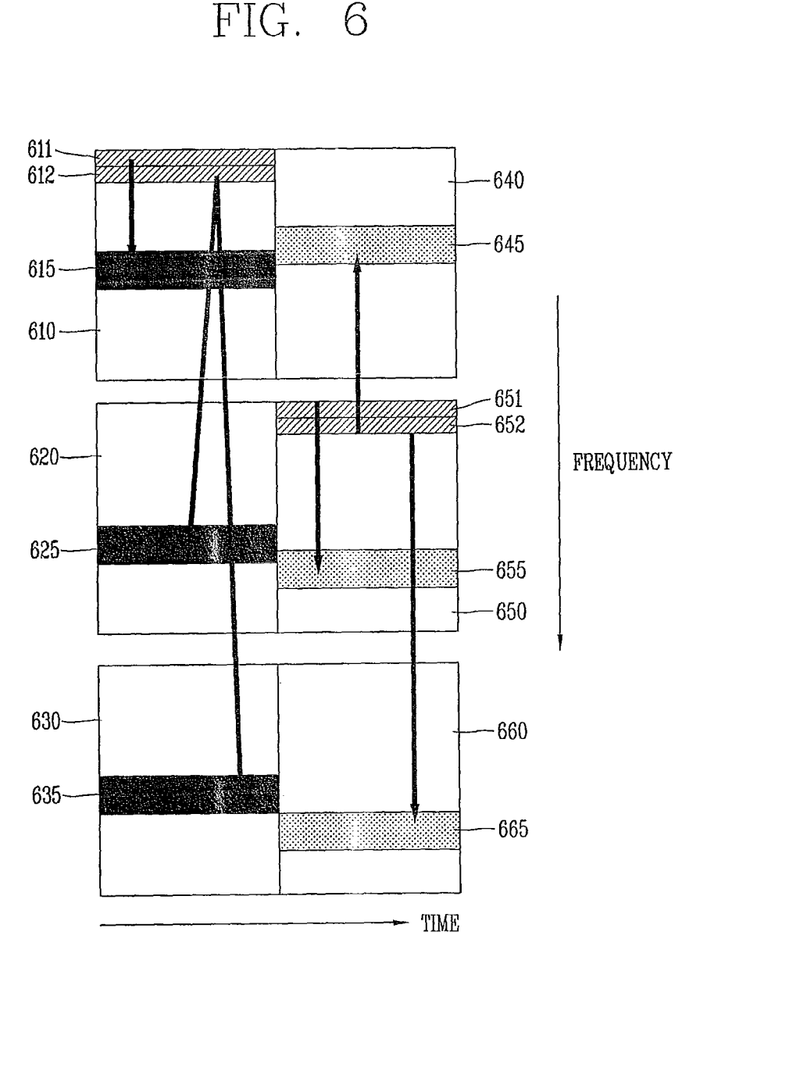
FIG. 6 is a view schematically illustrating a control channel allocation method in a multi-carrier system according to another embodiment of the present disclosure.

FIG. 6 is a view schematically illustrating a control channel allocation method in a multi-carrier system according to another embodiment of the present disclosure.

Similarly to FIG. 5, FIG. 6 illustrates a structure in which common control information of secondary carriers is transmitted through one primary carrier control channel in a multi-carrier system performing data transmission and reception through three carriers, thereby more optimizing control channels.

As illustrated in the above, if one MPDU is segmented into three in PHY to be transmitted through three carriers, the first frame (or subframe) is segmented into three and transmitted through three carriers 610, 620, 630, and the second frame (or subframe) is also segmented into three and transmitted through three carriers 640, 650, 660.

In the mobile station 1, it is assumed that the first carrier 610 of the first frame is a primary carrier, and the second and the third carrier 620, 630 thereof are secondary carriers.

In the mobile station 2, it is assumed that the second carrier 650 of the second frame is a primary carrier, and the first and the third carrier 640, 660 thereof are secondary carriers.

At this time, common control information of each carrier may be transmitted through one control channel of the primary carrier (A-MAP or PDCCH), and dedicated control information of each carrier may be transmitted by using another control channel of the primary carrier.

In other words, since common control information of all carriers is transmitted to a control channel for a primary carrier in the control channel of the primary carrier, the common control information is duplicated in the control channel for a secondary carrier allocated to a control channel region of the primary carrier and thus it is not required to be transmitted. Through this, a size of the control channel of the secondary carrier can be reduced, but it may be also configured such that the control channel of the secondary carrier has a same size as the control channel for a primary carrier, and dedicated control information of each carrier, such as resource allocation information of each carrier, may be included in the control channel for a secondary carrier in order to reduce the number of blind decoding iterations.

The following Table 1 illustrates the common control information and dedicated control information of a multi-carrier.

TABLE 1

| | Information field |
|---|---|
| common to all carrier | MIMO scheme |
| | MCS |
| | HARQ Information |
| | Station ID |
| Dedicated to each carrier | Logical carrier index |
| | Indication of data region in each carrier |

As classified in Table 1, common control information to all carriers may include a multiple input multiple output (MIMO) scheme, an MCS, a HARQ, a station ID, and the like.

The MIMO scheme may include information on spatial multiplexing or spatial diversity techniques, open loop or closed loop schemes related to whether information on channels is fed back from the receiving side to the transmitting side, precode matrix, and the like. Furthermore, the MCS may be information on an encoded MCS level, and the HARQ may include information on whether to retransmit, information related to a retransmission version, and the like, and the station ID may include an ID of mobile station.

Furthermore, dedicated information to each carrier may include a logical carrier index for each carrier, resource allocation information for each carrier (indication of data region in each carrier), and the like.

Since the common control information is control information common to all carriers, transmission through one channel without transmitting for each carrier is more effective. However, an index value and resource allocation information in each carrier should exist individually for each carrier, and they are required to be separated from common control information and allocated to the control channel.

As illustrated in the drawing, control channels 611, 612 for the mobile station 1 are transmitted through the first carrier, which is a primary carrier, similarly to FIG. 5. In the first carrier, control information for three carriers can be delivered by two regions having a control channel 611 allocated to common control information and a control channel 612 allocated to dedicated control information for each carrier.

In other words, the control channel 611 for the first carrier 610 may include common control information, which is common to other carriers, and dedicated control information to the second and the third carrier, which are secondary carriers, is transmitted to the control channel 612 for the secondary carrier.

Accordingly, compared to the foregoing control channel region in FIG. 5, the transmission of control information can be made only by allocating two control channels, thereby allowing more effective control channel allocation. If the number of carriers is increased, then further increasing an effect of reducing the number of allocated control channels.

Similarly, control channels 651, 652 for the mobile station 2 are transmitted through the second carrier 650, which is a secondary carrier, similarly to FIG. 5. In the second carrier, control information for all carriers can be delivered by two regions having a control channel 651 allocated to common control information and a control channel 652 allocated to dedicated control information for each carrier.

In other words, the control channel 651 for the second carrier 650 may include common control information, which is common to other carriers, and dedicated control information to the first and the third carrier, which are secondary carriers, is transmitted to the control channel 652 for the secondary carrier.

At this time, all the control channels 611, 612, and 651, 652 of one mobile station are configured to have a same channel size and a same MCS level as illustrated in the drawing, and also configured to be sequentially transmitted, thereby minimizing the number of decoding iterations when performing blind decoding for the control channels in the mobile station.

Figure 7:
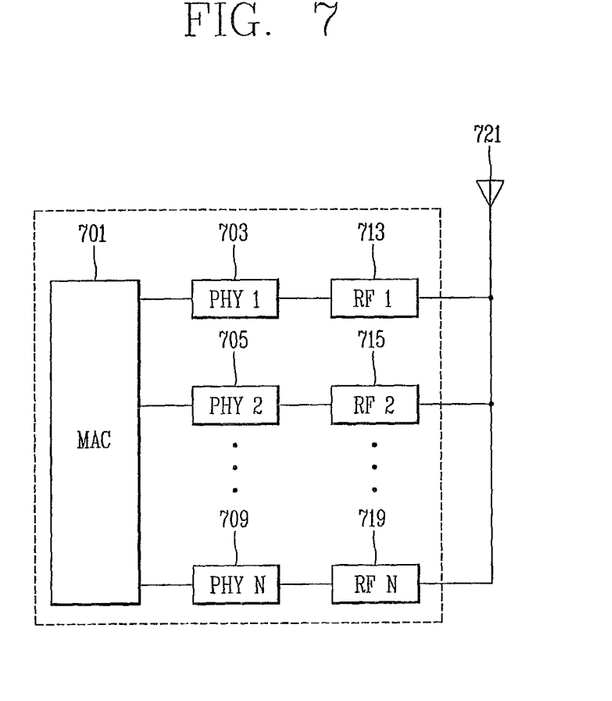
FIG. 7 is a block diagram schematically illustrating a multi-carrier transmission and reception apparatus according to an embodiment of the present disclosure.

FIG. 7 is a block diagram schematically illustrating a multi-carrier transmission and reception apparatus according to an embodiment of the present disclosure.

A multi-carrier transmission and reception apparatus according to the present disclosure may include one common MAC layer, a plurality of PHY layers and RF transceivers corresponding to the number of supported carriers, and an antenna.

In the common MAC layer 701, an MAC protocol data unit (MPDU) is configured to be transmitted to a physical (PHY) layer.

The PHY layers 703, 705, 709 receives the MPDU delivered from the MAC layer 701 through PHY SAP and performs channel coding and modulation to generate a modulated symbol sequence, and segments the modulated symbol sequence into a plural number.

The RF transceivers 713, 715, 719 allocates the symbol sequences segmented into the plural number to a plurality of carriers, respectively, to perform an inverse fast Fourier transform (IFFT), and then transmits them to the receiving side.

Here, control information for the plurality of carriers is allocated to a control channel of the data frame transmitted to the first carrier which is a primary carrier, and the control information will not be transmitted but only data traffic will be transmitted to other carriers.

The control information allocated to the control channel has been described in detail with reference to FIGS. 5 and 6, and thus the detailed description thereof will be omitted herein.

The method according to the present invention as described above may be implemented by software, hardware, or a combination of both. For example, the method according to the present invention may be stored in a storage medium (for example, an internal memory of the terminal, flash memory, hard disk, and so on), and may be implemented by codes or instructions within a software program that can be performed by a processor (for example, a microprocessor within the terminal).

Though preferred embodiments of present invention are exemplarily described as disclosed above, the scope of the invention is not limited to those specific embodiments, and thus various modifications, variations, and improvements can be made in the present invention without departing from the spirit of the invention, and within the scope of the appended claims.

The invention claimed is:

1. A method for transceiving data using a primary carrier and at least one secondary carrier between a mobile station and a base station in a multi-carrier system, the method performed by the base station and comprising:
    allocating first control information for a primary carrier and at least one secondary carrier to a control channel region of the primary carrier;
    transmitting the first control information through the primary carrier; and
    transceiving the data through the primary carrier and the at least one secondary carrier,
    wherein the primary carrier is a standalone carrier that is usable without the at least one secondary carrier, and the at least one secondary carrier is an additional carrier that is not usable without the primary carrier, and
    wherein the control channel region for the first control information is configured with a plurality of control channels having a same size and a same modulation and coding scheme (MCS) level, and configured to be sequentially transmitted.

2. The method of claim 1, wherein the first control information includes common control information for both the primary carrier and the at least one secondary carrier and a second control information for the at least one secondary carrier which includes only dedicated control information for the at least one secondary carrier.

3. The method of claim 2,
    wherein the common control information comprises at least one of a mobile station ID, an MCS level, data retransmission related information or information regarding a multiple input multiple output (MIMO) scheme, and
    wherein the dedicated control information comprises a carrier index of the at least one secondary carrier and data region indication information allocated to the at least one secondary carrier.

4. The method of claim 1,
wherein the primary carrier is a fully configured carrier which is capable of transceiving data traffic and all types of control information, and
wherein the at least one secondary carrier is a partially configured carrier which is capable of transmitting the data traffic and limited types of the control information.

5. A method for transceiving data using a primary carrier and at least one secondary carrier between a mobile station and a base station in a multi-carrier system, the method performed by the mobile station and comprising:
receiving first control information for a primary carrier and at least one secondary carrier through a control channel region of the primary carrier; and
transceiving the data through the primary carrier,
wherein the primary carrier is a standalone carrier that is usable without the at least one secondary carrier, and the at least one secondary carrier is an additional carrier that is not usable without the primary carrier, and
wherein the control channel region for receiving the first control information is configured with a plurality of control channels having a same channel size and a same modulation and coding scheme (MCS) level, and configured to be sequentially transmitted.

6. The method of claim 5, wherein the first control information includes common control information for both the primary carrier and the at least one secondary carrier, and a second control information for the at least one secondary carrier which includes only dedicated control information for the at least one secondary carrier.

7. The method of claim 6,
wherein the common control information comprises at least one of a mobile station ID, an MCS level, data retransmission related information or information regarding a multiple input multiple output (MIMO) scheme, and
wherein the dedicated control information of the at least one secondary carrier comprises a carrier index of the at least one secondary carrier and data region indication information allocated to the at least one secondary carrier.

8. The method of claim 5,
wherein the primary carrier is a fully configured carrier which is capable of transceiving data traffic and all types of control information, and
wherein the at least one secondary carrier is a partially configured carrier which is capable of transmitting the data traffic and limited types of the control information.

9. An apparatus for transceiving data using a primary carrier and at least one secondary carrier between a mobile station and a base station in a multi-carrier system, the apparatus comprising:
a radio frequency (RF) transceiver; and
a processor which is configured to control the RF transceiver and configured to:
allocate first control information for a primary carrier and at least one secondary carrier to a control channel region of the primary carrier;
transmit the first control information through the primary carrier; and
transceive the data through the primary carrier and the at least one secondary carrier,
wherein the primary carrier is a standalone carrier that is usable without the at least one secondary carrier, and the at least one secondary carrier is an additional carrier that is not usable without the primary carrier, and
wherein the control channel region for the first control information is configured with a plurality of control channels having a same size and a same modulation and coding scheme (MCS) level, and configured to be sequentially transmitted.

10. The apparatus of claim 9, wherein the first control information includes common control information for both the primary carrier and the at least one secondary carrier, and a second control information for the at least one secondary carrier which includes only dedicated control information for the at least one secondary carrier.

11. The apparatus of claim 10,
wherein the common control information comprises at least one of a mobile station ID, an MCS level, data retransmission related information or information regarding a multiple input multiple output (MIMO) scheme, and
the dedicated control information comprises a carrier index of the at least one secondary carrier and data region indication information allocated to the at least one secondary carrier.

12. The apparatus of claim 9,
wherein the primary carrier is a fully configured carrier which is capable of transceiving data traffic and all types of control information, and
wherein the at least one secondary carrier is a partially configured carrier which is capable of transmitting the data traffic and limited types of the control information.

\* \* \* \* \*